United States Patent
Takayama et al.

(10) Patent No.: US 10,061,084 B1
(45) Date of Patent: Aug. 28, 2018

(54) COUPLING STRUCTURE OF OPTICAL COMPONENTS AND COUPLING METHOD OF THE SAME

(71) Applicant: SAE Magnetics (H.K.) Ltd., Hong Kong (CN)

(72) Inventors: Seiichi Takayama, Hong Kong (CN); Kiyohiko Abe, Hong Kong (CN); Ryuji Fujii, Hong Kong (CN); Takashi Honda, Hong Kong (CN); Shi Xiong Chen, Hong Kong (CN); Osamu Harakawa, Hong Kong (CN)

(73) Assignee: SAE MAGNETICS (H.K.) LTD., Hong Kong (CN)

( * ) Notice: Subject to any disclaimer, the term of this patent is extended or adjusted under 35 U.S.C. 154(b) by 0 days.

(21) Appl. No.: 15/445,258

(22) Filed: Feb. 28, 2017

(51) Int. Cl.
  *G02B 6/30* (2006.01)
  *G02B 6/42* (2006.01)
  *G02B 6/02* (2006.01)
  *G02B 6/38* (2006.01)

(52) U.S. Cl.
  CPC ........... *G02B 6/30* (2013.01); *G02B 6/02395* (2013.01); *G02B 6/3893* (2013.01); *G02B 6/4295* (2013.01)

(58) Field of Classification Search
  CPC .... G02B 6/30; G02B 6/4295; G02B 6/02395; G02B 6/3893
  See application file for complete search history.

(56) References Cited

U.S. PATENT DOCUMENTS

| | | | |
|---|---|---|---|
| 4,867,524 A | 9/1989 | Courtney et al. | |
| 4,871,226 A | 10/1989 | Courtney et al. | |
| 5,790,730 A * | 8/1998 | Kravitz | G02B 6/30 385/14 |
| 6,367,988 B1 * | 4/2002 | Auracher | G02B 6/30 385/88 |
| 6,526,204 B1 * | 2/2003 | Sherrer | G02B 6/30 385/49 |
| 6,846,113 B2 * | 1/2005 | Yeh | G02B 6/4238 385/88 |
| 7,076,136 B1 * | 7/2006 | Picot | G02B 6/30 385/129 |
| 9,348,094 B1 * | 5/2016 | Liu | G02B 6/3636 |
| 2011/0228650 A1 | 9/2011 | Shimazawa et al. | |
| 2016/0341919 A1 | 11/2016 | Liu et al. | |

FOREIGN PATENT DOCUMENTS

| | | |
|---|---|---|
| JP | 1-310315 | 12/1989 |
| JP | 5-27140 | 2/1993 |

* cited by examiner

*Primary Examiner* — Ryan Lepisto
(74) *Attorney, Agent, or Firm* — Nixon & Vanderhye PC

(57) ABSTRACT

A coupling structure of optical components has a first optical component, a second optical component and a coupling solder layer. The first optical component has a lensed fiber, a first holder holding the lensed fiber and a first metal layer formed on a first connecting end face of the first holder. The second optical component has a waveguide, a second holder holding the waveguide and a second metal layer formed on a second connecting end face of the second holder. The coupling solder layer is in direct contact with both of the first metal layer and the second metal layer, and formed with solder.

11 Claims, 20 Drawing Sheets

COUPLING STRUCTURE OF OPTICAL COMPONENTS AND COUPLING METHOD OF THE SAME

BACKGROUND

Field of the Invention

The present invention relates to a coupling structure of optical components which optical components, having at least one of a waveguide and an optical fiber, are coupled, and a coupling method of the optical components.

Related Background Art

A waveguide device, having a waveguide has been conventionally known as one of optical components constituting an optical communication system, an optical measuring instrument and an optical sensor or the like. In recent years, a large-scale integration and high functionality have developed in the waveguide device as well along with the capacity enlargement and high functionality in the optical communication system. Silicon photonics, which optical devices such as light emitting element, light receiving element are integrated on a silicon substrate with minute waveguide, has been conventionally known as technology for realizing the above technology. The waveguide substrate, manufactured utilizing the silicon photonics, is also called as silicon photonics substrate.

In general, when the waveguide device and the optical fiber are coupled, placing the end surface of the waveguide opposite the end surface of the optical fiber and an alignment of the optical axes are performed, and afterward the optical fiber is fixed to the waveguide device. Then, when the optical fiber is fixed to the waveguide device, an adhesive is sometimes used, as disclosed in, for example, U.S. Patent Application Publication No. 2016/0341919A1 (referred also to as patent document 1) and U.S. Pat. No. 4,871,226 (referred also to as patent document 2). Further, a weld is sometimes performed, as disclosed in, for example, JP Patent laid-open publication H1-310315 (referred also to as patent document 3) and U.S. Pat. No. 4,867,524 (referred also to as patent document 4).

SUMMARY OF THE INVENTION

By the way, some optical fibers are optical fibers which tip parts have a lens-shape (referred also to as a lensed fiber). Then, in conventional technology, as disclosed in the patent document 1, the adhesive is used when the lensed fiber is coupled to the waveguide device. In the patent document 1, epoxy resin adhesive curable with an ultraviolet ray is applied on the part which the waveguide device is coupled to the optical fiber (referred also to "optical fiber coupled part", in the following), the adhesive is cured due to the irradiation of the ultraviolet ray to the optical fiber coupled part.

However, when the adhesive is cured due to the irradiation of the ultraviolet ray, every one optical fiber coupled part takes approximately about 120 seconds till the adhesive is cured. Therefore, when the adhesive is used for coupling of the waveguide device and the optical fiber, the coupling structure of waveguide device and the optical fiber is not able to be manufactured efficiently. Further, the optical axes of the waveguide device and the optical fiber are sometimes out of alignment before the adhesive is cured. Therefore, when the adhesive is used, the accuracy of coupling sometimes deteriorates.

On the other hand, solder is sometimes used, when the optical fiber is fixed to the waveguide device, for example, as disclosed in the JP Patent laid-open publication H5-27140 (referred also to as patent document 5).

However, in the conventional technology disclosed in the patent document 5, solder bump, having grain shape, are used. If there are size differences of the solder bumps, they bring sometimes distance differences between the end surface of the waveguide and the end surface of the optical fiber. Therefore, when the lensed fiber is used as the patent document 1, the focus position of the lensed fiber becomes sometimes out of alignment. Accordingly, if the solder bumps are used, the accuracy of coupling sometimes deteriorates.

Further on the other hand, there is a magnetic recording head called as a thermally assisted magnetic recording head in the field of the magnetic recording technology such as a hard disk drive or the like. The thermally assisted magnetic recording head is the magnetic recording head which a thermally assisted magnetic recording system is employed. In the thermally assisted magnetic recording system, a magnetic recording medium is heated instantaneously by laser light, date is recorded on the magnetic recording medium. Concerning the thermally assisted magnetic recording head, there is a conventional technology which laser light emitting element is coupled to the waveguide with solder (for example, see U.S. Patent Application Publication No. 2011/228650A1 (referred also to as patent document 6)).

However, the conventional technology of the patent document 6 is a technology about the structure which laser light emitting element (laser diode) is coupled to the waveguide. In the conventional technology of the patent document 6, the case, which the optical fiber is fixed to the waveguide device, has not been considered. Further, even if the conventional technology of the patent document 6 is considered, solder is used instead of the adhesive in the conventional technology of the patent document 1, time for coupling is shortened, and the deterioration about the accuracy of coupling is just avoided accompanied with it, the accuracy of coupling has never been enhanced.

Further, even if other conventional technology is applied to the conventional technology of the patent document 1, alignment for focus position of the lensed fiber with high accuracy is not able to be accomplished.

The above-described subjects are common with not only the structure which the waveguide device is coupled to the optical fiber but also the structure which the waveguide device is coupled to the waveguide device, and the structure which the optical fiber is coupled to the optical fiber.

The present invention is made to solve the above problem, and it is an object to provide a coupling structure of optical components having structure, which time for coupling is able to be reduced, and coupling accuracy is able to be enhanced, especially high accurate coupling concerning the lensed fiber is able to be realized, and coupling method of the optical components.

To solve the above problems, the present invention is a coupling structure of optical components including: a first optical component, a second optical component and a coupling solder layer; the first optical component includes at least one of a first optical fiber or a first waveguide, a first holder holding at least one of the first optical fiber or the first waveguide and a first metal layer formed on a first connecting end face, of the first holder, being connected with the second optical component, the second optical component includes at least one of a second optical fiber or a second waveguide, a second holder holding at least one of the second optical fiber or the second waveguide and a second metal layer formed on a second connecting end face, of the second holder, being connected with the first optical component; the coupling solder layer is in direct contact with both of the first metal layer and the second metal layer, and formed with solder.

It is preferable that the above-described the coupling structure of optical components further includes an interval adjusted structure which the interval between the first optical fiber or the first waveguide and the second optical fiber or the second waveguide is adjusted by a holder pushing which the first holder is pushed.

Further, it is preferable that the coupling solder layer includes a thickness different structure, which a thickness of a fiber neighboring part, arranged in the nearest part to the first optical fiber or the first waveguide, is thinner than thickness of part except for the fiber neighboring part.

Further, the present invention provides a coupling structure of optical components including: a first optical component, a second optical component and a coupling solder layer; the first optical component includes a lensed fiber having a tip part formed by a lens-shape, a first holder holding the lensed fiber and a first metal layer formed on a first connecting end face, of the first holder, being connected with the second optical component, the second optical component includes a waveguide, a second holder holding the waveguide and a second metal layer formed on a second connecting end face, of the second holder, being connected with the first optical component; the coupling solder layer is in direct contact with both of the first metal layer and the second metal layer, and formed with solder, the coupling structure of optical components further including: an interval adjusted structure which the interval between the lensed fiber and the waveguide is adjusted so that the focus of the lensed fiber coincides with the waveguide by a holder pushing, which the first holder is pushed.

In case of the above-described the coupling structure of optical components, it is preferable that the coupling solder layer includes a thickness different structure, which a thickness of a fiber neighboring part, arranged in the nearest part to the lensed fiber, is thinner than thickness of part except for the fiber neighboring parts.

Further, it is preferable that the first holder includes a first back end surface opposing to the first connecting end surface and the second holder includes a second back end surface opposing to the second connecting end surface, the first holder has a first parallel part, and the second holder has a second parallel part, the first parallel part is a part of the first back end surface or the first connecting end surface, and the first parallel part is a part formed in parallel of the first back end surface and the first connecting end surface, the second parallel part is a part of the second connecting end surface, and the second parallel part is a part formed in parallel with the first back end surface.

Further, the present invention provides a coupling method of optical components including: a first optical component manufacturing step being manufactured a first optical component; and a second optical component manufacturing step being manufactured a second optical component, the first optical component manufacturing step, which a first holder component, being held at least one of a first optical fiber or a first waveguide on a first holder, is prepared, and a first metal layer is formed on a first connecting end surface being connected with the second optical component concerning the first holder component, and the first optical component is manufactured, the second optical component manufacturing step, which a second holder component, being held at least one of a second optical fiber or a second waveguide on a second holder, is prepared, and a second metal layer is formed on a second connecting end surface being connected with the first optical component concerning the second holder component, and the second optical component is manufactured, the coupling method of optical components further including: a holder opposing step being opposed the first connecting end surface and the second connecting end surface to insert a solder between the first metal layer and the second metal layer, concerning the first optical component and the second optical component; an optical axis adjusting step being adjusted optical axes of at least one of the first optical fiber or the first waveguide and at least one of the second optical fiber or the second waveguide so as to coincide each other; and a solder forming step being formed a solder layer between the first metal layer and the second metal layer by melting and stiffening the solder with laser irradiation to the first optical component or the second optical component.

In the above-described the coupling method of the optical components, it is possible that the coupling method of optical components further including: a holder pushing step being performed a holder pushing, which the first holder or the second holder is pushed along with an optical axis direction; and an interval adjusting step being adjusted an interval between the first optical fiber or the first waveguide and the second optical fiber or the second waveguide, by the holder pushing; the solder forming step is performed while the holder pushing is performed.

Further, it is preferable that the holder pushing step is performed so that a first center of gravity extended part, of a first back end surface opposing to the first connecting end surface, arranged on a center of gravity extended line of the first holder, or a second center of gravity extended part, of a second back end surface opposing to the second connecting end surface, arranged on the center of gravity extended line of the second holder, is pushed along with the optical axis direction.

Furthermore, it is preferable that the holder pushing step is performed so that a pushing member is in contact with the first center of gravity extended part or the second center of gravity extended part and the pushing member is operated along with the vertical direction.

Further, the present invention provides a coupling method of optical components including: a first optical component manufacturing step being manufactured a first optical component; and a second optical component manufacturing step being manufactured a second optical component, the first optical component manufacturing step, which a first holder component, being held a lensed fiber having a tip part formed by a lens-shape on a first holder is prepared, and a first metal layer is formed on a first connecting end surface being connected with the second optical component concerning the first holder component, and the first optical component is manufactured, the second optical component manufacturing step, which a second holder component, being held a waveguide is held on a second holder, is prepared, and a second metal layer is formed on a second connecting end surface being connected with the first optical component concerning the second holder component, and the second optical component is manufactured, the coupling method of optical components further including: a holder opposing step being opposed the first connecting end surface and the second connecting end surface to insert a solder between the first metal layer and the second metal layer, concerning the first optical component and the second optical component; an optical axis adjusting step being adjusted optical axes of the lensed fiber and the waveguide so as to coincide each other; a holder pushing step being performed a holder pushing which the first holder is pushed along with an optical axis direction; an interval adjusting step being adjusted an interval between the lensed fiber and the second waveguide, so that the focus of the lensed fiber coincides with the waveguide by the holder pushing; and a solder forming step being formed a solder layer between the first metal layer and the second metal layer by melting and stiffening the solder with laser irradiation to the first optical component, while the holder pushing is performed.

It is possible that the holder pushing step is performed so that a first center of gravity extended part, of a first back end surface opposing to the first connecting end surface, arranged on a center of gravity extended line of the first holder, is pushed along with the optical axis direction.

Further, it is possible that the holder pushing step is performed so that a pushing member is in contact with the first center of gravity extended part and the pushing member is operated along with the vertical direction.

The present invention will be more fully understood from the detailed description given hereinbelow and the accompanying drawings which are given by way of illustration only, and thus are not to be considered as limiting the present invention.

DETAILED DESCRIPTION OF THE EMBODIMENTS

In the following, embodiments of the present invention will be described with reference to the drawings. Note that the same components will be referred to with the same numerals or letters, while omitting their overlapping descriptions.

(Coupling Structure of Optical Components)

Figure 1:
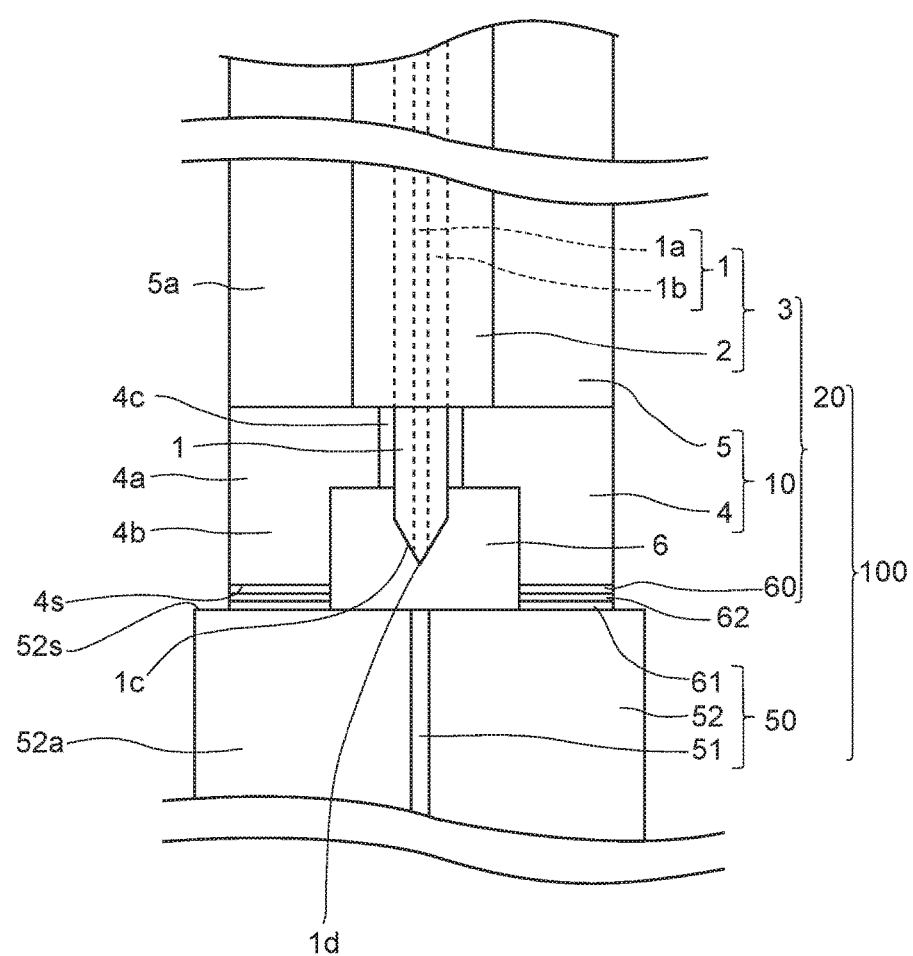
FIG. 1 is a plan view showing the state of the coupling structure of optical components, which a lid part is remove, according to an embodiment of the present invention with a part of it omitted.
Figure 2:
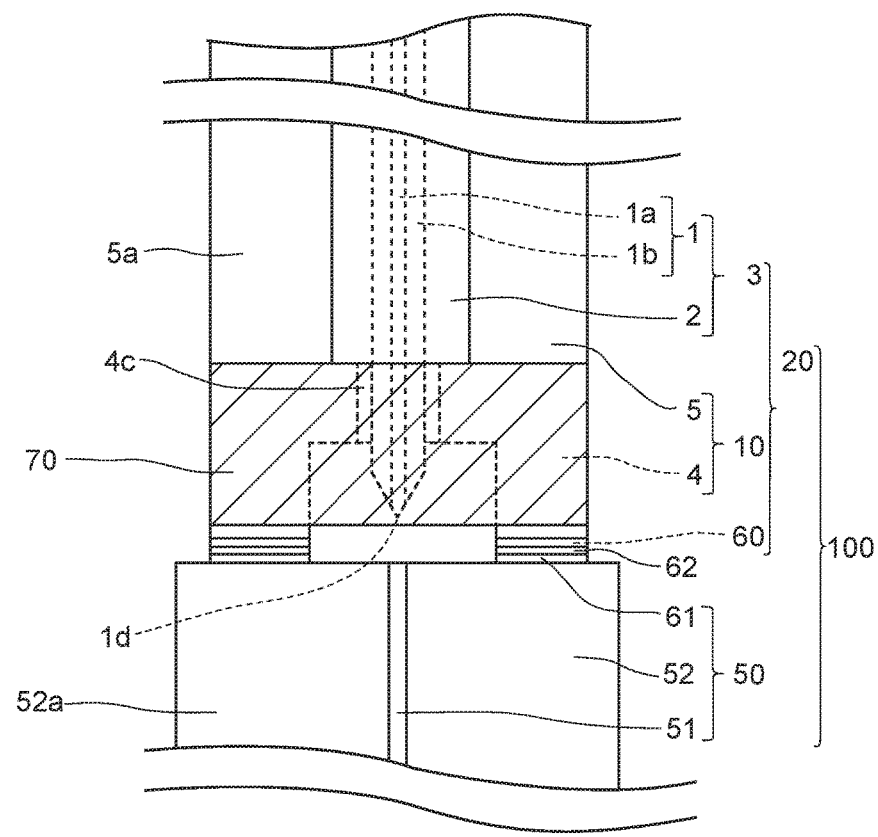
FIG. 2 is a plan view showing the essential part of the coupling structure of optical components with a part of it omitted.
Figure 3:
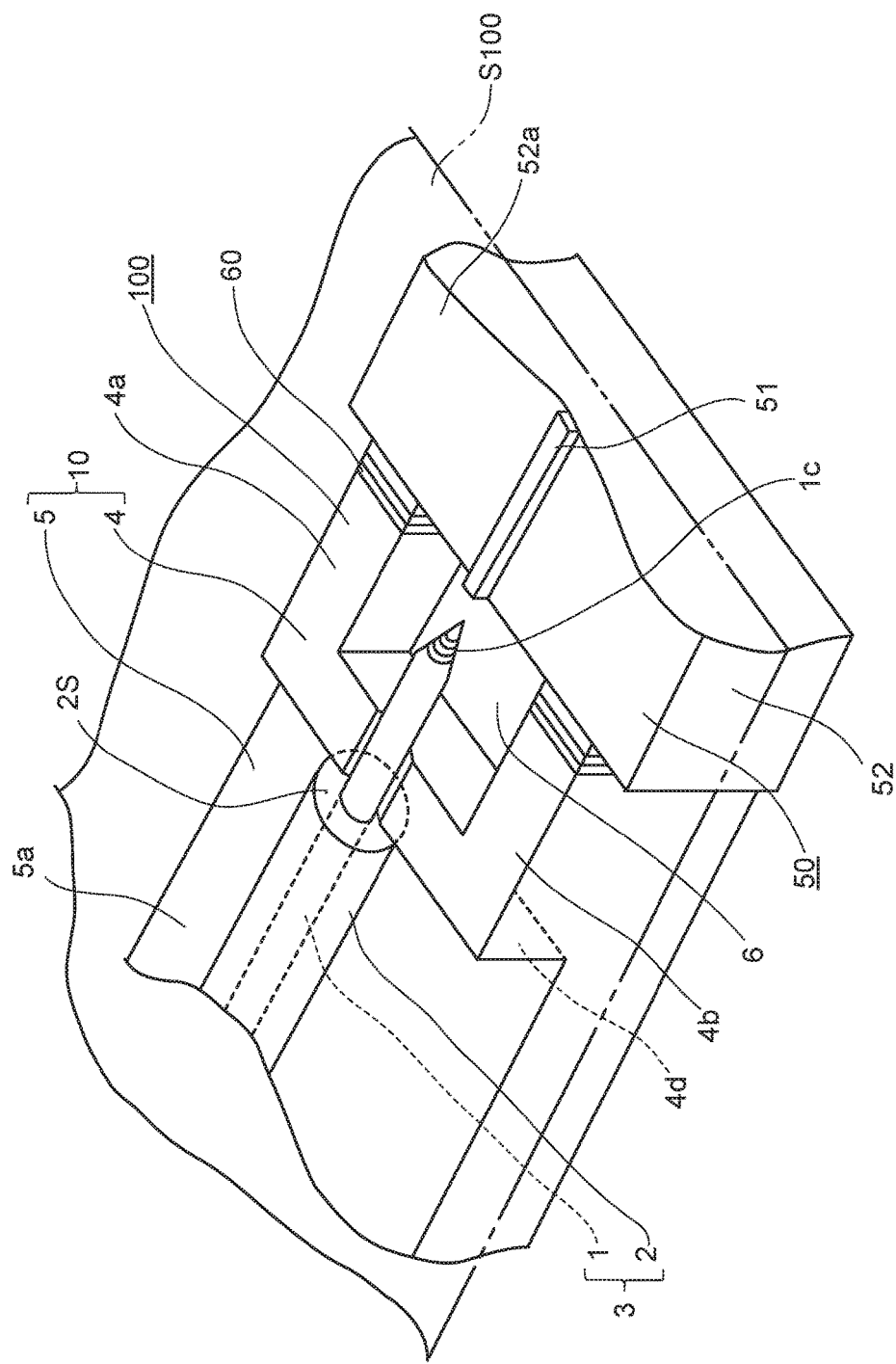
FIG. 3 is a perspective view showing the state of the coupling structure of optical components which a lid part is remove with a part of it omitted.
Figure 4:
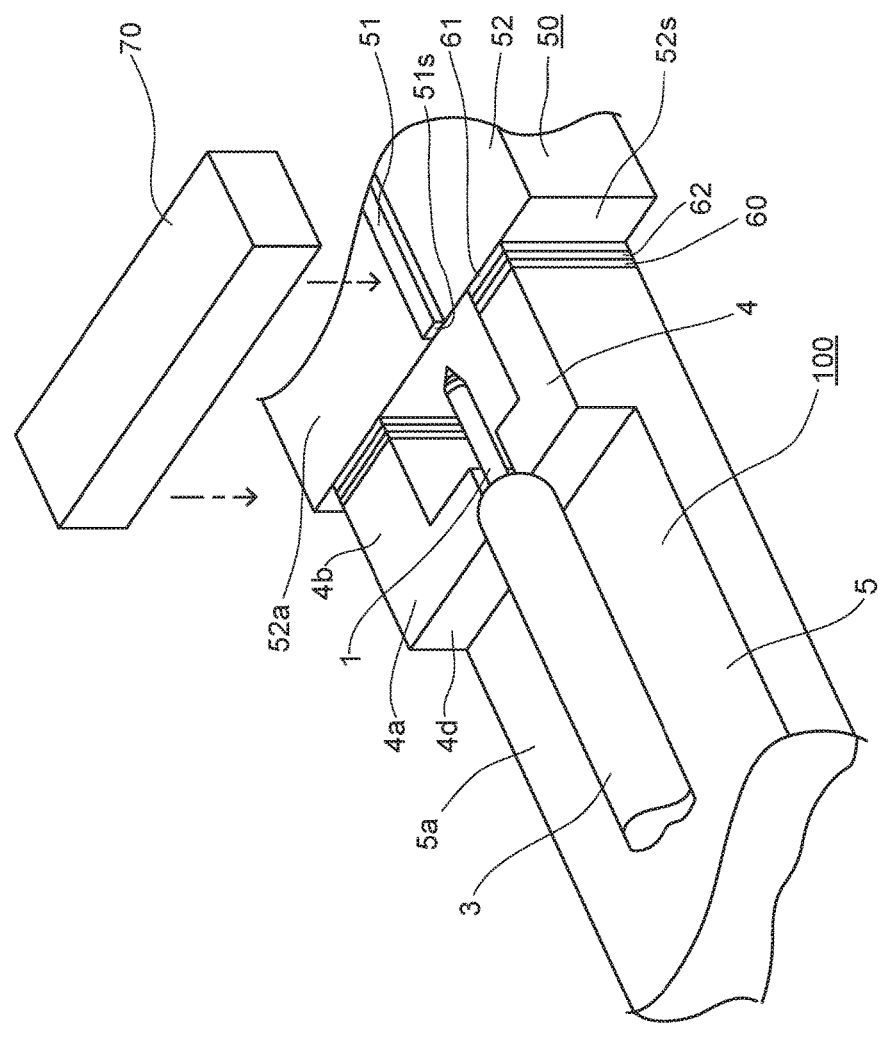
FIG. 4 is an exploded perspective view of the coupling structure of optical components.
Figure 5:
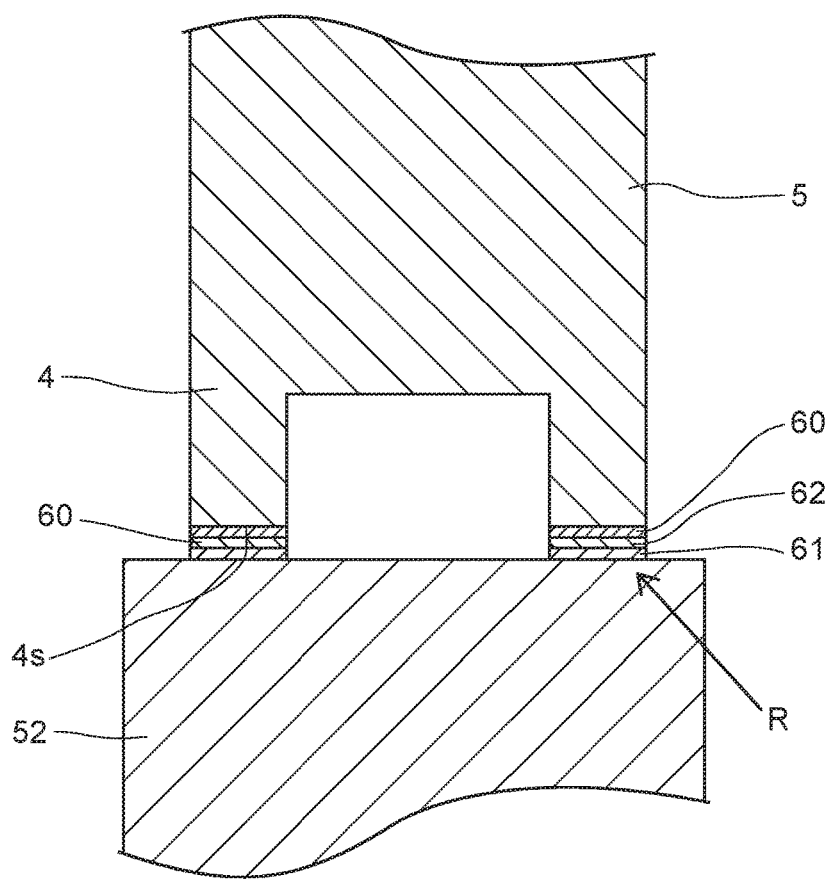
FIG. 5 is a sectional view of the essential part of coupling structure of optical components taken along a plane S100 illustrated in FIG. 3.
Figure 6:
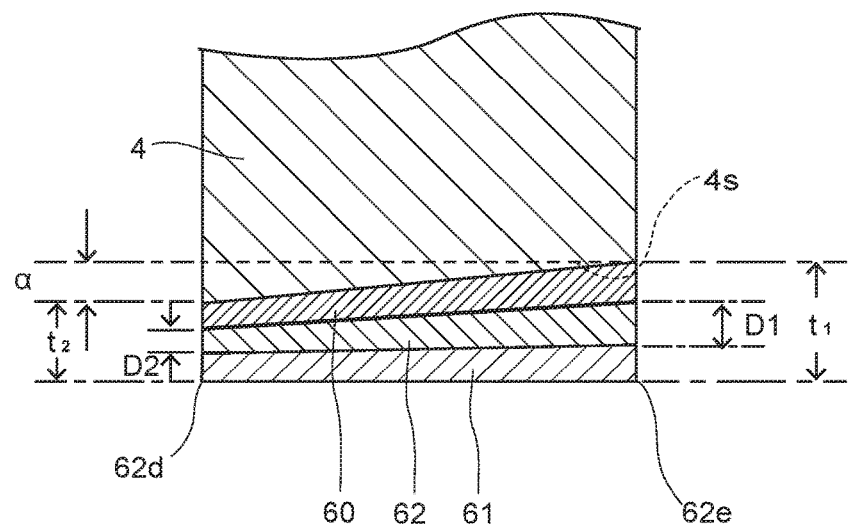
FIG. 6 is an enlarged sectional view showing a part illustrated by R in FIG. 5.

To begin with, the coupling structure of optical components 100 according to the embodiment of the present invention will be explained with reference to FIG. 1 to FIG. 6. Here, FIG. 1 is a plan view showing the state of the coupling structure of optical components 100, which a lid part 70 is remove, according to an embodiment of the present invention with a part of it omitted. FIG. 2 is a plan view showing the essential part of the coupling structure of optical components 100 with a part of it omitted. FIG. 3 is a perspective view showing the state of the coupling structure of optical components which the lid part 70 is remove with a part of it omitted. FIG. 4 is an exploded perspective view of the coupling structure of optical components 100. FIG. 5 is a sectional view of the essential part of coupling structure of optical components 100 taken along a plane S100 illustrated in FIG. 3. FIG. 6 is an enlarged sectional view showing a part illustrated by R in FIG. 5.

As illustrated in detail FIG. 1, the coupling structure of optical components 100 has a first optical component 20, a second optical component 50 and coupling solder layers 62.

The first optical component 20 has a coated optical fiber 3, a first holder 10 and first metal layers 60.

The coated optical fiber 3 has an optical fiber 1 and a covering layer 2. The optical fiber 1 has a core $1a$ and a cladding layer $1b$, and it has two-layer structure which the cladding layer $1b$ covers the circumference of the core $1a$. The optical fiber 1 is a lensed fiber having a tip part $1c$ of lens-shape, processed in tapered-shape.

The covering layer 2 is a member covering the circumference of the optical fiber 1, and it is formed with silicone resin. A part of the covering layer 2 on the tip side is removed. The optical fiber 1 is exposed in the part which the covering layer 2 is removed.

The first holder 10 is formed with glass, silicon which light having predetermined wavelength penetrates, GaAs, SiC, AlN (Aluminum nitride), metal such as gold, aluminum, stainless steel or the like. The first holder 10 has a fiber holding part 4 and a wire holding part 5. The fiber holding part 4 holds a part of the coated optical fiber 3, which the covering layer 2 is removed. The wire holding part 5 holds a part of the coated optical fiber 3, which the covering layer 2 is not removed.

Figure 9:
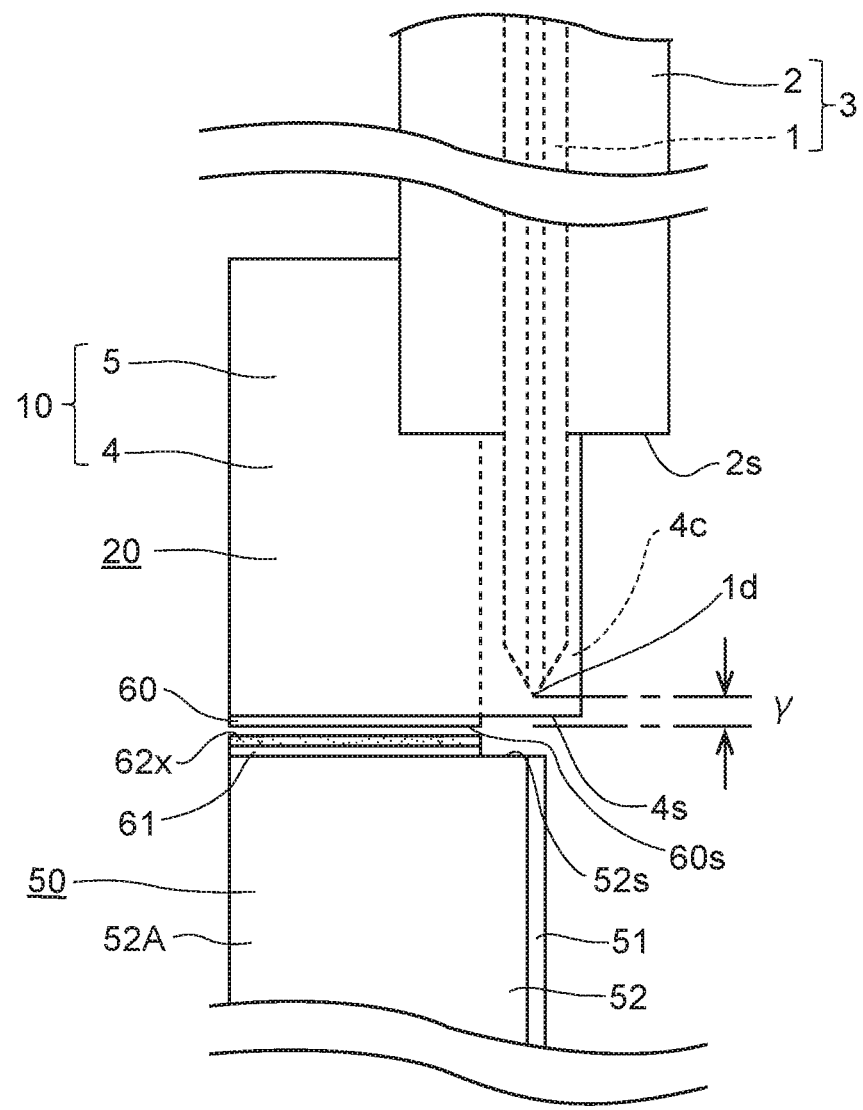
FIG. 9 is a side elevation view showing an opposing state of the first optical component and a second optical component before coupling with a part of them omitted.

The fiber holding part 4 has an approximately C-figure shape in a plane view having two connecting parts 4b. A V-figure groove part 4c is formed in a part connecting one connecting part 4b to the other connecting part 4b, in a surface 4a of the fiber holding part 4. The optical fiber 1 is accommodated inside of the V-figure groove part 4c. Then, as illustrated in FIG. 3, FIG. 4, end surface 2s of the covering layer 2 is in contacts with a standing end surface 4d of the fiber holding part 4. Further, tip side of the optical fiber 1 protrudes in the vacant part 6, and a most-end part 1d, which protrudes the most, is opposed to the later-described waveguide 51. The most-end part 1d recedes approximately 5 μm than a surface 60s of the first metal layer 60 (y in FIG. 9 is about approximately 5 μm).

Further, the first metal layers 60 are formed on the fiber holding part 4. The first metal layers 60 are formed on end faces of the connecting parts 4b, 4b of the second optical component 50 side (arranged in the closest position to the second optical component 50), namely on connecting surfaces 4s, 4s (first connecting surfaces, see FIG. 5 to FIG. 7) being connected with the second optical component 50. The first metal layers 60 are formed with metal having good connection with solder (for example, Au). Further, for example, the first metal layers 60 are formed by sputtering or plating.

The wire holding part 5 is connected with the standing end surface 4d of the fiber holding part 4. The coated optical fiber 3 is put on the surface 5a. The wire holding part 5 has a thickness which is thinner than the that of the fiber holding part 4.

The second optical component 50 has the waveguide 51, a second holder 52 and second metal layers 61. The waveguide 51 is formed on a surface 52a of the second holder 52, and the waveguide 51 is held by the second holder 52. As illustrated in FIG. 4, an end surface 51s of the waveguide 51 is exposed in the later-described second connection end surface 52s. The end surface 51s is opposed to the most-end part 1d of the optical fiber 1.

The second holder 52 is formed with silicon. The second holder 52 is the silicon photonics substrate. The waveguide 51 is formed on the surface 52a though, optical devices such as light-emitting element, light-receiving element or the like able to be integrated on the surface 52a.

The second metal layers 61 are formed on parts of the second connection end face 52s corresponding to the connecting end surfaces 4s, 4s. The second connecting end face 52s is the end face of the second holder 52 on the first optical component 20 side. The second metal layers 61 are formed with metal having good connection with solder (for example, Au). Further, for example, the second metal layers 60 are formed by sputtering or plating.

Then, as illustrated in FIG. 5, the coupling solder layers 62 are formed between the first metal layers 60 and the second metal layers 61, and they are in direct contact with both of the first metal layers 60 and the second metal layers 61. FIG. 5 is sectional view of the essential part of the coupling structure of optical components 100 taken along the plane S100, the plane S100 is a plane pass through the middle of the second optical component 50 in the thickness direction.

The coupling solder layers 62 are formed with solder. For example, the coupling solder layers 62 are formed with one metal selected from the group of tin, tin alloy, silver, copper, lead alloy and bismuth. Further, as illustrated in FIG. 6, the coupling solder layers 62, the first metal layers 60 and the second metal layers 61 have thickness different structure.

Namely, in the coupling solder layers 62, thicknesses of fiber neighboring parts 62d are thinner than thickness except for the fiber neighboring parts 62d. As illustrated in detail in FIG. 6, the thickness of the fiber neighboring parts 62d of the coupling solder layers 62 are D2, and the thicknesses of the other parts are larger than D2. For example, the thicknesses of the thickest thickness parts (thickest parts 62e) are D1 (D1>D2). The coupling solder layers 62 have thickness changing structure which the thickness gradually increases from the fiber neighboring parts 62d toward the thickest parts 62e. The fiber neighboring parts 62d are parts arranged in the nearest parts to the coated optical fiber 3 (optical fiber 1) of the coupling solder layers 62 and the first, second metal layers 60, 61.

Further, concerning the thicknesses of the first, second metal layers 60, 61 and the coupling solder layers 62, the difference between the thicknesses t1 of the thickest parts 62e and the thicknesses t2 of the fiber neighboring parts 62d are α (t2−t1=α).

Then, the coupling structure of optical components 100 has an interval adjusted structure. The interval adjusted structure is a structure which the interval between the coated optical fiber 3 (optical fiber 1) and the waveguide 51 is adjusted so that the focus of the optical fiber 1 coincides with the waveguide 51 by the later-described holder pushing. In the coupling structure of optical components 100, the interval between the coated optical fiber 3 and the waveguide 51 is adjusted by the later-described holder pushing so that the focus of the optical fiber 1 coincides with the waveguide 51, and after that, the first optical component 20 is coupled with the second optical component 50 while the pushing state is maintained. Thereby, the coupling structure of optical components 100 has the interval adjusted structure.

Further, the coupling structure of optical components 100 has the lid part 70. The illustrated lid part 70 is fixed with the surface 4a of the fiber holding part 4 using adhesive or the like so as to cover the optical fiber 1. The lid part 70 does not need to be fixed with the surface 4a.

Figure 8:
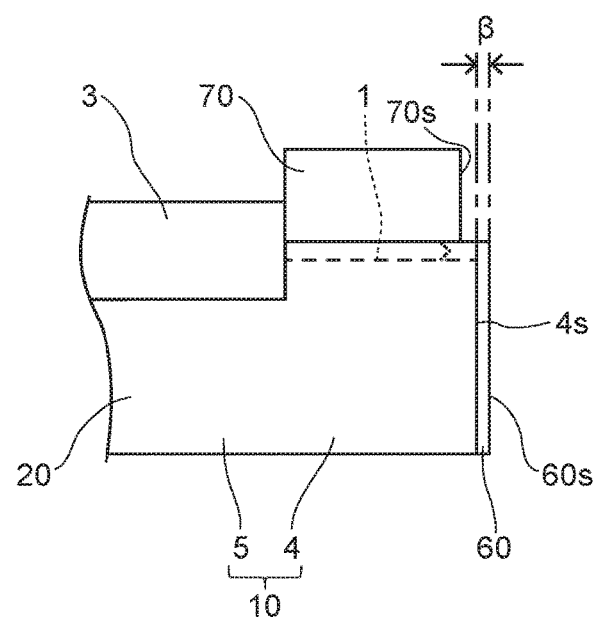
FIG. 8 is a side elevation view showing an essential part of the first optical component and the lid part.

The length of the lid part 70 (the length along with length direction of the coated optical fiber 3) is shorter than the length of the fiber holding part 4. Further, as illustrated in FIG. 8, an end surface 70s of the lid part 70 is arranged in the position receding from the surface 60s of the first metal layer 60. The interval between the surface 60s and the end face 70 is β.

(Coupling Method of Optical Components)

Figure 7:
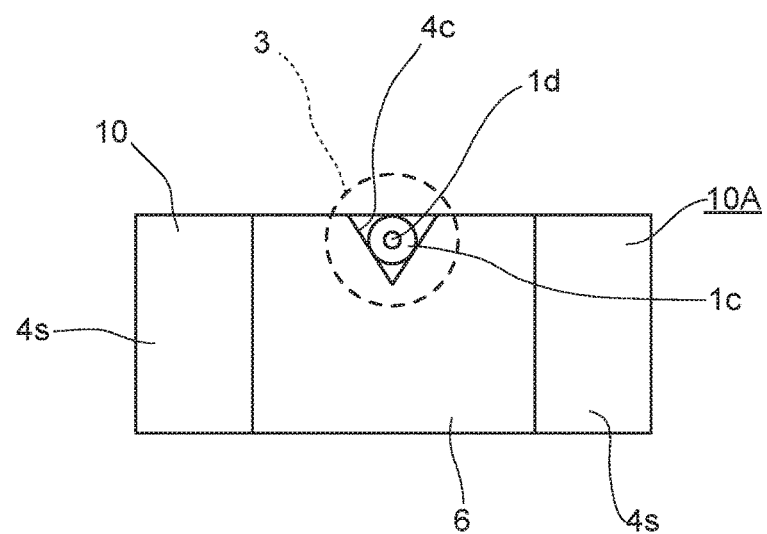
FIG. 7 is a front view of a first holder component.
Figure 10:
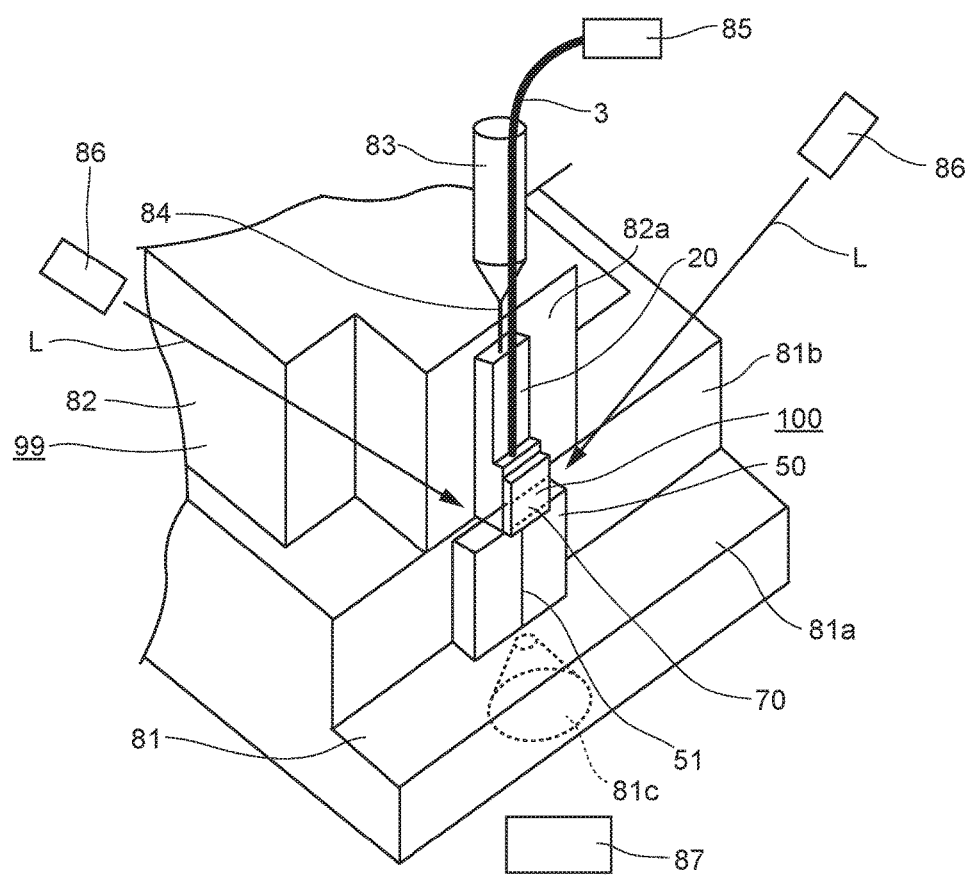
FIG. 10 is a sectional view showing a coupling apparatus of the optical components and the first, second optical components.
Figure 11:
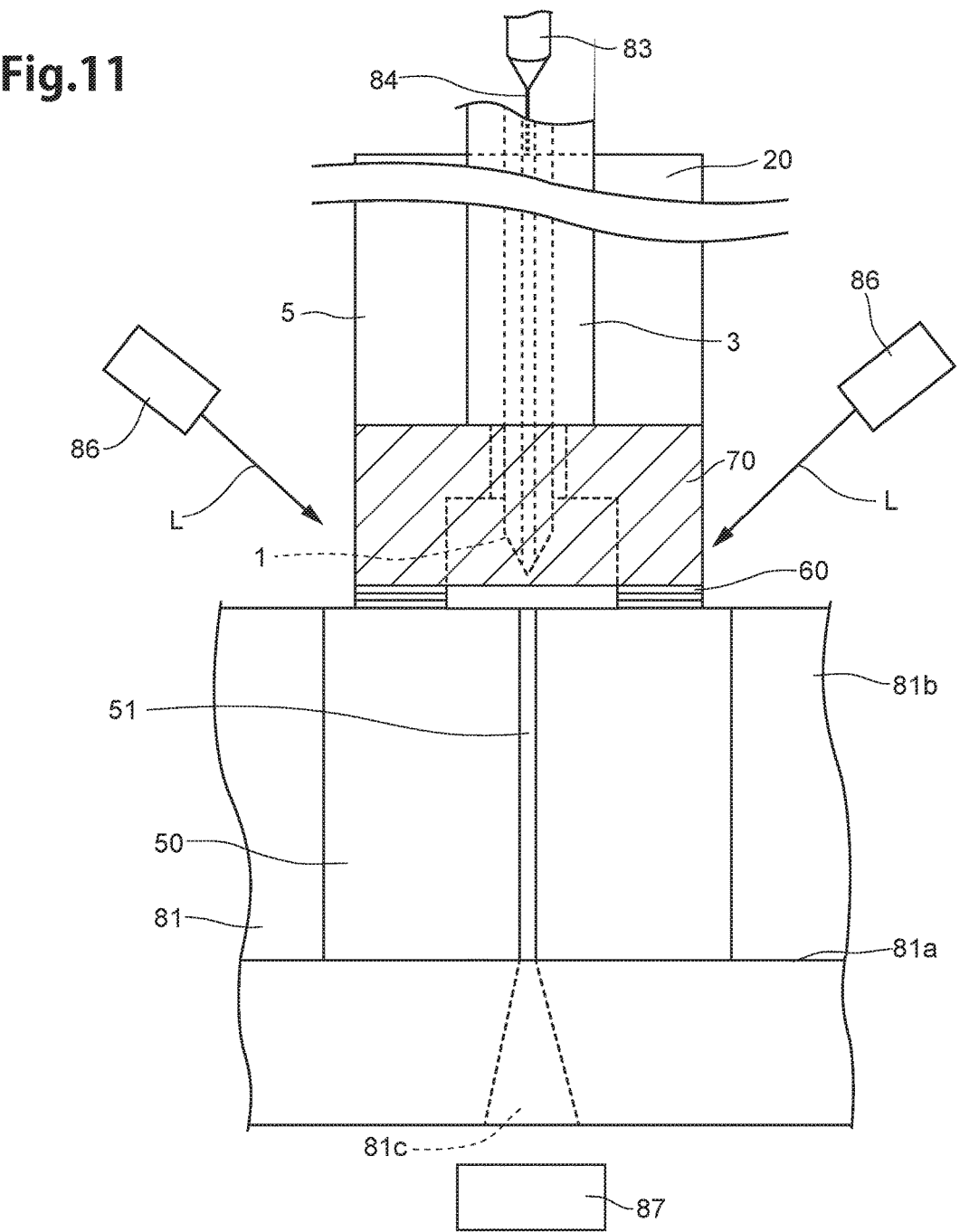
FIG. 11 is a front view showing the first, second optical components held on the coupling apparatus of the optical components.

Subsequently, a coupling method, which the first optical component 20 is coupled with the second optical component 50, will be explained with reference to FIG. 7 to FIG. 11. FIG. 7 is a front view of a first holder component 10A, FIG. 8 is a side elevation view showing an essential part of the first optical component 20 and the lid part 70. FIG. 9 is a side elevation view showing an opposing state of the first optical component 20 and the second optical component 50 before coupling with a part of them omitted. FIG. 10 is a sectional view showing a coupling apparatus 99 of the optical components and the first, second optical components 20, 50. FIG. 11 is a front view showing the first, second optical components 20, 50 held on the coupling apparatus 99 of the optical components.

The above-described coupling structure of optical components 100 is obtained by performing of the coupling method of optical components according to an embodiment of the present invention. The coupling method of optical components according to the present embodiment is performed using the coupling apparatus 99 of the optical components. The coupling apparatus 99 has, as illustrated in FIG. 10, a holding apparatus 81, a holding apparatus 82, a pushing apparatus 83, an external apparatus 85, a laser irradiation apparatus 86 and an external detector 87.

Then, the coupling method of optical components has a first optical component manufacturing step and a second optical component manufacturing step. The first optical component 20 is manufactured in the first optical component manufacturing step, the second optical component 50 is manufactured in the second optical component manufacturing step.

At first, in the first optical component manufacturing step, as illustrated in FIG. 7, the first holder component 10A, which the coated optical fiber 3 is held on the first holder 10, is prepared. The first holder component 10A has the coated optical fiber 3 and the first holder 10. The first metal layers 60 are formed on the first connecting end surfaces 4s, 4s, concerning the first holder component 10A, for example by sputtering or the plating. The first metal layers 60 are formed with metal having good connection with solder (for example, Au). When the first metal layers 60 are formed on the first holder component 10A, as illustrated in FIG. 9, the first optical component 20 is manufactured.

At first, in the second optical component manufacturing step, as illustrated in FIG. 9, the second holder component 52A, which the waveguide 51 is held on the second holder 52, is prepared. The second holder component 52A has the waveguide 51 and the second holder 52. The second metal layers 61 are formed on the second connecting end surfaces 52s, 52s, concerning the second holder component 52A, for example by sputtering or the plating. The second metal layers 61 are formed with metal having good connection with solder (for example, Au). When the second metal layers 61 are formed on the second holder component 52A, the second optical component 50 is manufactured.

Further, the coupling method of optical components has a holder opposing step, an optical axis adjusting step, a holder pushing step, an interval adjusting step and a solder layer forming step.

At first, in the holder opposing step, as illustrated in FIG. 9, the first connecting end faces 4s, 4s are opposed to the second connecting end faces 52s, 52s, concerning the first optical component 20 and the second optical component 50, At this step, as illustrated in FIG. 10, the first optical component 20 is held by the holding apparatus 82, and the second optical component 50 is held by the holding apparatus 81.

The holding apparatus 82 has a wall part 82a, which a not-illustrated suction hole is formed, and the wall part 82a holds the first optical component 20 by air suction from the suction hole. The holding apparatus 81 has a pedestal part 81a and a wall part 81b. The second optical component 50 is put on the pedestal part 81a. Air suction, from the not-illustrated suction hole formed on the wall part 81b, is performed. The second optical component 50 is held by the air suction.

Further, in the holder opposing step, when the first connecting end faces 4s, 4s are opposed to the second connecting end faces 52s, 52s, as illustrated in FIG. 9, the first holder 10 and the second holder 52 are arranged so that the first metal layers 60 are opposed to the second metal layers 61 with predetermined intervals. On that occasion, solder 62x are inserted between the first metal layers 60 and the second metal layers 61.

Next, the optical axis adjusting step is performed. In this step, an optical axis adjustment, which the optical axes of the optical fiber 1 and the waveguide 51 are made to fit each other, is performed. Namely, the positions of the first optical component 20 and the second optical component 50 are adjusted so that the optical axes of the optical fiber 1 and the waveguide 51 are made to fit each other. At this time, in the coupling apparatus 99, light emitting element, of the external apparatus 85 such as not-illustrated laser diode or the like, emits light and the light is guided to the optical fiber 1 of coated the optical fiber 3. Whereupon, as also illustrated in FIG. 11, the light from the external apparatus 85 passes from the coated optical fiber 3 through the waveguide 51 and emits from the hole part 81c, and the light is detected by the external detector 87 having a light receiving element such as a photodiode or the like. The external detector 87 is provided on the outside of the second optical component 50. The optical axis adjustment is performed while the detection result by the external detector 87 is confirmed.

Note that the light emitting apparatus having the light emitting element is able to be arranged outside the second optical component 50, and the detector having the light receiving element is able to be arranged outside the first optical component 20.

Figure 14:
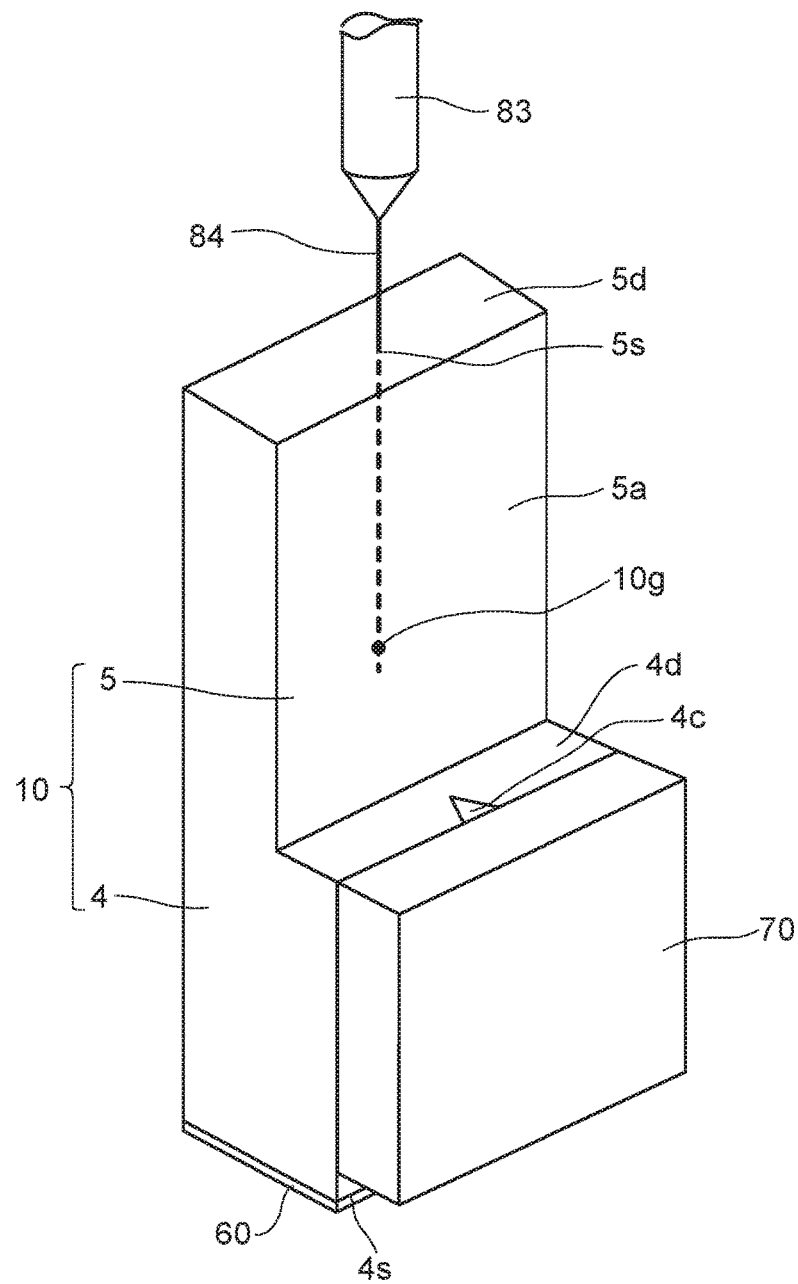
FIG. 14 is a perspective view showing the first optical component which the coated optical fiber is omitted, the lid part and a pushing apparatus.

Subsequently, the holder pushing step is performed. In this step, the holder pushing is performed. The holder pushing means that the first holder 10 is pushed along with the optical axes direction. On that occasion, as illustrated in FIG. 10, FIG. 14, a back end surface 5d of the first holder 10 is pushed by the pushing apparatus 83. As illustrated in FIG. 14, the back end surface 5d is side surface, opposing to the first connecting end surface 4s. The back end surface 5d is arranged on the rear side of the first connecting end surface 4s.

The pushing apparatus 83 has a pushing pin 84 as a pushing member according to the present invention. The pushing pin 84 contacts a pushing point of the back end surface 5d, and it applies predetermined load (20-100 gf, for example about 80 gf) to the pushing point. By this way, the first holder 10 is pushed along with the optical axes direction. In this case, it is preferable that the pushing point is a center of gravity extended part 5s. The center of gravity extended part 5s is arranged on a center of gravity extended line. The center of gravity extended line is straight line which passes the center of gravity 10g of the first holder 10 and passes the first connecting end surface 4s and the back end surface 5d.

Further, it is preferable that the pushing apparatus 83 operates the pushing pin 84 along with the vertical direction. Thereby, the first holder 10 is pushed along with the direction of the gravity in the vertical direction, the holder pushing is performed efficiently.

The holder pushing by the pushing apparatus 83 narrows the interval between the first holder 10 and the second holder 50. Therefore, the interval adjusting step is performed. The interval adjusting step is a step which the interval between the most-end part 1d of the optical fiber 1 and end surface 51s of the waveguide 51 is adjusted so that the focus of the optical fiber 1 coincides with the waveguide 51 by the holder pushing. The focus of the optical fiber 1 coincides with the waveguide 51 by performing of the interval adjusting step. At this time, the interval adjusting step is performed while the detection result by the external detector 87 is confirmed as well as the above-described optical axis adjustment.

Further, the solder layer forming step is performed while the holder pushing is performed. In this step, the coupling solder layers 62 are formed between the first metal layers 60 and the second metal layers 61. As illustrated in FIG. 10, the laser irradiation apparatus 86 irradiates YAG laser L to the solder 62x. The irradiation of the YAG laser L melts the solder 62x, after that the solder 62x is stiffened. After the solder 62x melts, it can be supposed that a layer, made from alloy of Au and solder, is formed.

The laser irradiation apparatus 86 irradiates YAG laser L instantaneously, when the above-described holder pushing is performed, namely the first holder 10 is pushed by the push pin 84 (for example, about 0.1 second). Then, the light receiving point of YAG laser L in the solder 62x is heated. The solder 62x melts by the heat. After that, when the solder 62x is stiffened, the coupling solder layers 62 are formed between the first metal layers 60 and the second metal layers 61. The coupling solder layers 62 are in direct contact with both of the first metal layers 60 and the second metal layers 61. By the above step, the first optical component 20 is coupled to the second optical component 50 to manufacture the coupling structure of optical components 100.

(Operation and Effect of Coupling Structure of Optical Components)

As mentioned above, in the coupling structure of optical components 100, the first optical component 20 is coupled to the second optical component 50 with the coupling solder layers 62. The coupling solder layers 62 are formed with solder. The coupling method with solder, according to the present invention, is completed in an extremely short time (approximately about 6 seconds).

Therefore, the first optical component 20 is coupled to the second optical component 50 in an extremely short time. The time for coupling of the coupling structure of optical components 100 is shortened than the conventional technology. Accordingly, the coupling structure of optical components 100 is able to be manufactured efficiently than the conventional technology. The coupling structure of optical components 100 is able to be manufactured more abundantly than the conventional technology.

Further, the solder 62x is stiffened in an extremely short time, the coupling step is completed in an extremely short time. Therefore, the optical axis of the optical fiber 1 never becomes out of alignment before completion of the coupling step, and focus position also never becomes out of alignment. Accordingly, the accuracy of coupling in the coupling structure of optical components 100 is always maintained, and it is never deteriorated.

Furthermore, the coupling structure of optical components 100 has the interval adjusted structure. Therefore, in the coupling structure of optical components 100, the state, which the interval between the most-end part 1d and the end surface 51s is adjusted, is maintained so that the focus of the optical fiber 1 coincides with the waveguide 51. Accordingly, coupling accuracy of the coupling structure of optical components 100 is enhanced, especially, coupling with high accuracy concerning the lensed fiber is realized.

Especially, because the coupling solder layers 62 are formed with solder 62x, the coupling solder layers 62 transform slightly by the holder pushing. Therefore, the interval between the first optical component 20 and the second optical component 50 is able to be adjusted minutely, the optical axis adjustment and the focus position adjustment are able to be performed with high accuracy.

When the interval between most-end part 1d and the end surface 51s is adjusted, it is preferable that the first holder 10 is pushed along with the optical axis direction. This is because coincidence of the optical axis can be realized even if the interval adjustment between the most-end part 1d and the end surface 51s is completed. At this point, in the coupling structure of optical components 100, in the holder pushing step, the first holder 10 is pushed by the holder pushing along with the optical axis direction. Therefore, in the coupling structure of optical components 100, coincidence of the optical axes of the first optical component 20 and the second optical component 50 is maintained, even if the interval adjustment by the holder pushing is completed, coupling with high accuracy is realized.

Further, when the holder pushing step is performed, the pushing pin 84 contacts with the center of gravity extended part 5s of the back end surface 5d to push the first holder 10. The center of gravity extended part 5s is arranged on a center of gravity extended line. If different part from the center of gravity extended part 5s is pushed in the occasion of the holder pushing, there is a possibility that moment occurs, and it causes out of alignment about the optical axis. However, because the center of gravity extended part 5s is pushed, generation of the moment is able to be avoided. Therefore, the first holder 10 is pushed along with the optical axis direction, and coupling with high accuracy is performed.

Furthermore, the center of gravity extended part 5s is located at the neighborhood of the center of the back end surface 5d. Accordingly, if the first holder 10 is pushed, a stronger load is applied to the peripheral part of the vacant part 6 than the other part. Therefore, as illustrated in FIG. 6, the coupling solder layers 62 have the above-described thickness different structures. Having the thickness different structure means that the holder pushing is performed to the center of gravity extended part 5s.

Further, because the first holder 10 is pushed along with vertical direction, in the holder pushing step, weight of the pushing pin 84 is utilized, thereby the holder pushing is performed more efficiently.

Furthermore, the lid part 70 is arranged on the position receding from the surface 60s of the first metal layers 60. Therefore, when the first optical component 20 is coupled to the second optical component 50, especially the holder opposing step is performed, contact of the lid part 70 and the second optical component 50 is avoided. Accordingly, coupling of the first optical component 20 and the second optical component 50 is performed efficiently.

In the coupling structure of optical components 100, the optical components are coupled by the laser irradiation with smaller energy in compared with the case the optical components are coupled by weld as the conventional technology. Therefore, energy for manufacturing is reduced.

Modified Example 1

Figure 12:
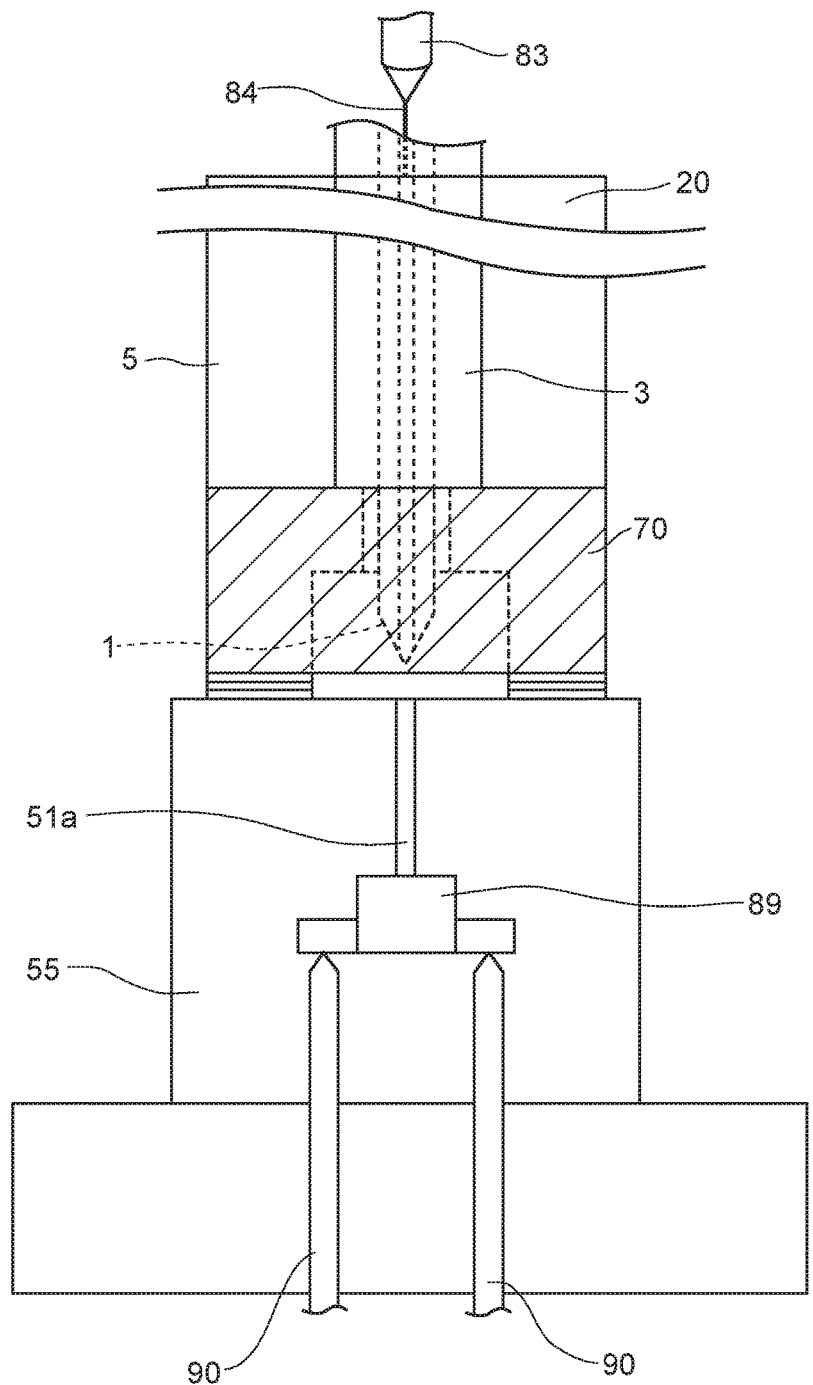
FIG. 12 is a plan view showing the essential part of the coupling structure of optical components, according to a modified example, with a part of it omitted.

In the above-described embodiment, the external detector 87 is provided outside the second optical component 50. As illustrated in FIG. 12, it is possible that the coupling structure of optical components has the first optical component 20 and the second optical component 55. The second optical component 55 is different from the second optical component 50 in that a photodiode 89, being a light receiving element, is formed on the surface of the silicon photonics substrate (second holder) with the waveguide 51. Proves 90 are connected with the photodiode 89.

Modified Example 2

Figure 13:
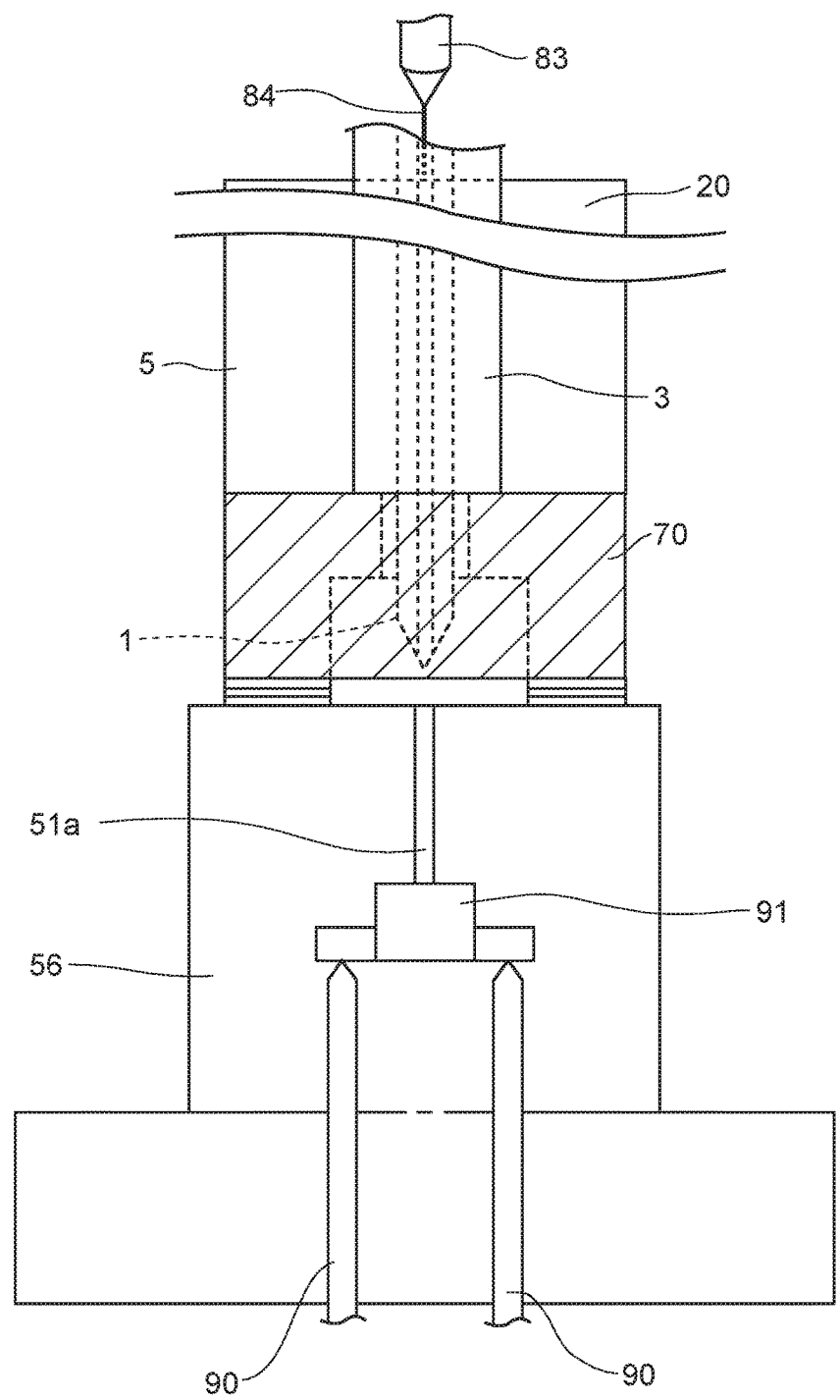
FIG. 13 is a plan view showing the essential part of the coupling structure of optical components, according to another modified example, with a part of it omitted.

Further, as illustrated in FIG. 13, it is possible that the coupling structure of optical components has the first optical component 20 and the second optical component 56. The second optical component 56 is different from the second optical component 50 in that a laser diode 91, being a light emitting element, is formed on the surface of the silicon photonics substrate (second holder) with the waveguide 51. Proves 90 are connected with the laser diode 89.

In this case, because the second optical component 56 has the light emitting element, when the coupling method is performed, the light receiving element, such as photodiode or the like, is arranged outside the first optical component 20.

Modified Example 3

In the above-described embodiment, the coupling structure of optical components 100, having the first optical component 20, which the coated optical fiber 3 is held, and the second optical component 50, which the waveguide 51 is held, is explained. In case of the coupling structure of optical components 100, the first optical component 20 has the lensed fiber, and the second optical component 50 has the waveguide 51.

However, concerning the present invention, the first optical component and the second optical component has respectively at least one of the optical fiber and the waveguide.

Figure 15:
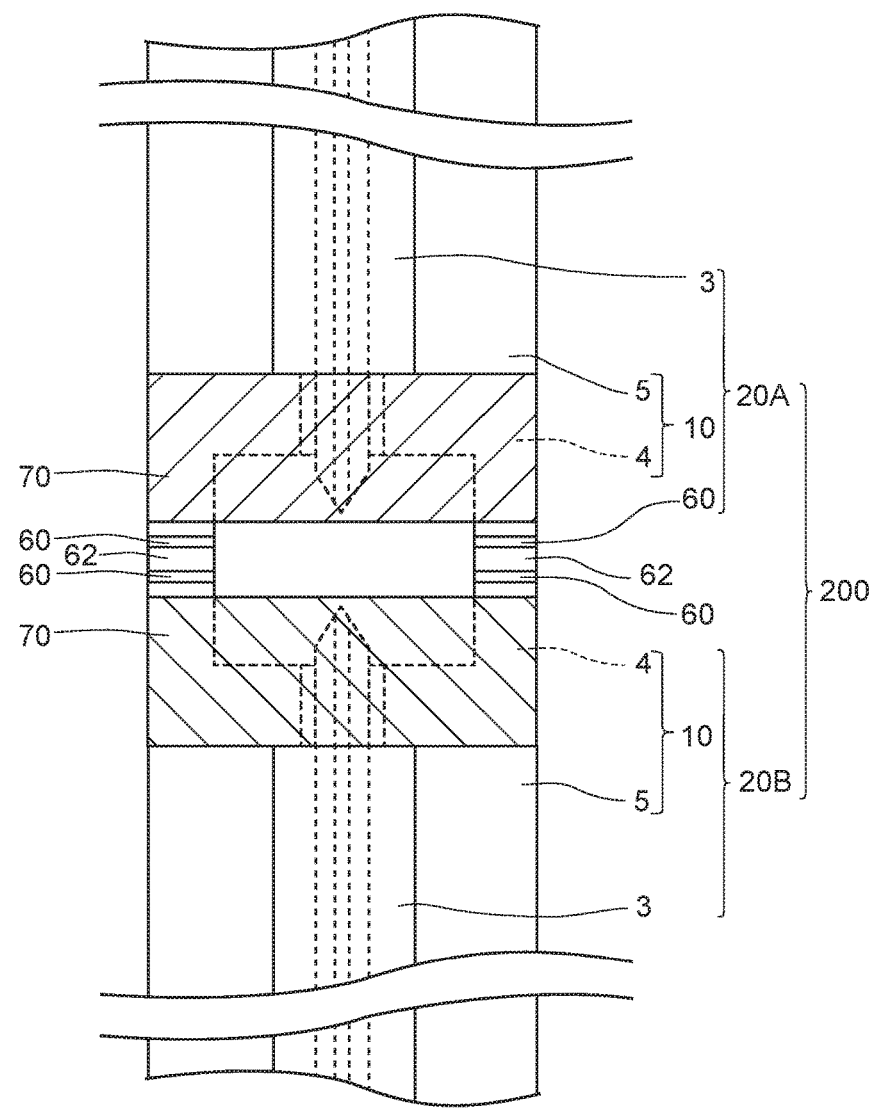
FIG. 15 is a plan view showing the coupling structure of optical components, according to a modified example, similar with FIG. 1.

Therefore, for example, it is possible that the coupling structure of optical components according to the present invention is a coupling structure of optical components 200 illustrated in FIG. 15. The coupling structure of optical components 200 has a first optical component 20A and a second optical component 20B, and both of them are coupled with the coupling solder layers 62. Both of the first, second optical components 20A, 20B hold the coated optical fibers 3, the both coated the optical fibers 3 are opposed each other. Both of the first, second optical components 20A, 20B have the same structures with the first optical component 20.

Figure 16:
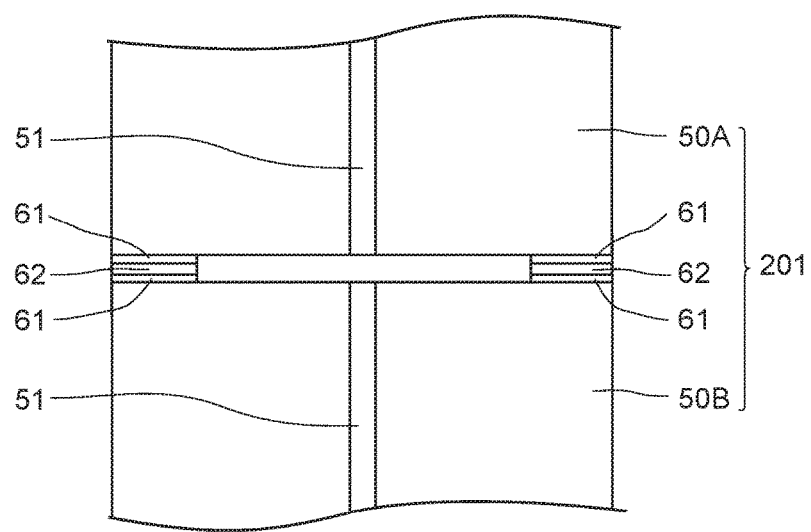
FIG. 16 is a plan view showing the coupling structure of optical components, according to another modified example, similar with FIG. 1.

Further, it is possible that the coupling structure of optical components according to the present invention is a coupling structure of optical components 201 illustrated in FIG. 16. The coupling structure of optical components 201 has a first optical component 50A and a second optical component 50B, and both of them are coupled with the coupling solder layers 62. Both of the first, second optical components 50A, 50B hold the waveguides 51, the both the waveguides 51 are opposed each other. Both of the first, second optical components 50A, 50B have the same structures with the second optical component 50.

Modified Example 4

Figure 17:
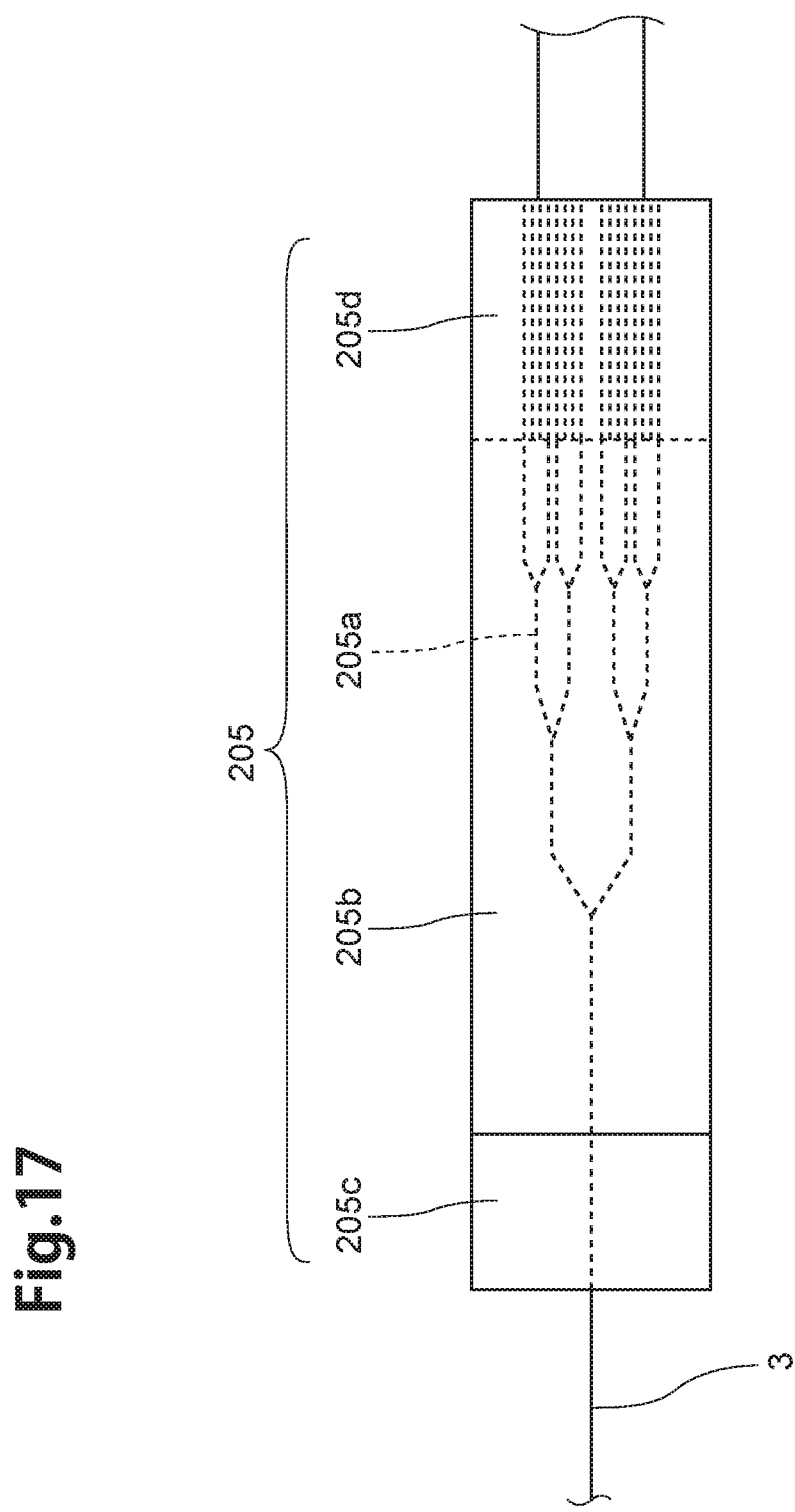
FIG. 17 is a plan view showing the coupling structure of optical components, according to still another modified example.

Further, the present invention is applied to a coupling structure of optical components 205 illustrated in FIG. 17. The coupling structure of optical components 205 has a first optical component 205c which the coated optical fiber 3 is held, a second optical component 205b which the waveguide 205a is held, and a third optical component 205d which a multi-core optical fiber 205 is held. The first optical component 205c, second optical component 205b and the third optical component 205d have respectively the same metal layers (not illustrated) with the first metal layers 60, the metal layers are formed on the respective connecting end surfaces of the first, second, third optical component 205c, 205b, 205d. Further, the same solder layers with the coupling solder layers 62 (not illustrated) are formed between each of metal layers. The first optical component 205c, the second optical component 205b and the third optical component 205d are coupled with the solder layers.

However, the connecting end surfaces of the first optical component 205c, the second optical component 205b and the third optical component 205d are formed along with the slanting direction from their side surfaces (angle between the connecting end surfaces and the side surfaces are slanting angle of an about 8 degree from the right angle). This is for avoiding the reflections of the light on the connecting end surfaces.

Figure 18:
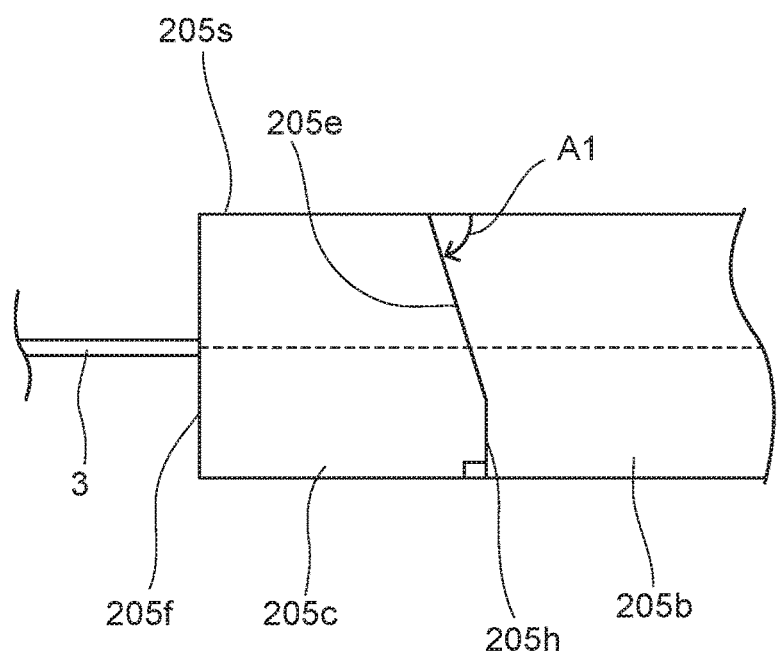
FIG. 18 is a plan view showing the essential part of the coupling structure of optical components according to a modified example.
Figure 20:
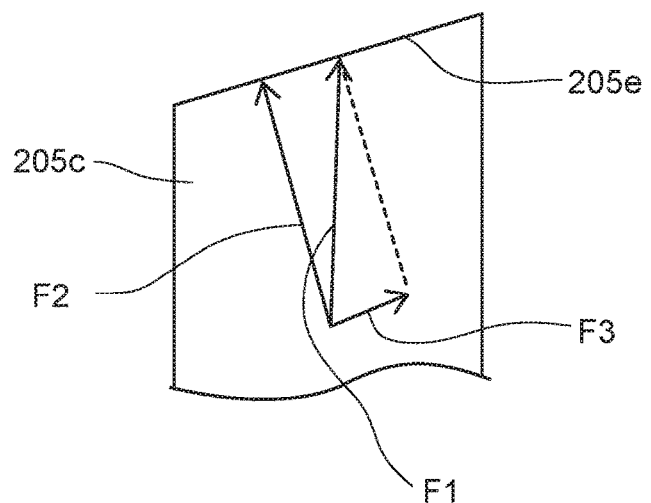
FIG. 20 is a plan view showing the essential part of the coupling structure of optical components illustrated in FIG. 17.

Then, if the holder pushing step is performed like the above-described coupling method of optical components, as illustrated in FIG. 20, load F1, applied by the pushing pin 84, operates to the connecting end surface 205e along with different direction from the vertical direction. As illustrated in FIG. 18, the angle A1 between the connecting end surface 205e and the side surface 205s is an acute angle. Although the load F1 is a resultant force of the load F2, intersecting orthogonally with the connecting end surface 205e, and the load F3, parallel to the connecting end surface 205e, the load F3 does not contribute to the holder pushing.

So, it is preferable that the coupling structure of optical components has the first holder having first parallel parts, and the second holder having second parallel parts. The first parallel parts are parts of the first back end surface or the first connecting end surface, and they are parts which the first back end surface and the first connecting end surface are formed in parallel. The second parallel parts are parts of the second connecting end surface, and they are parts formed in parallel with the first back end surface.

When it explains concretely, for example, in case of the coupling structure of optical components 205 illustrated in FIG. 17, it is possible that the first optical component (first holder) 205c has a parallel part 205h, as illustrated in FIG. 18. The parallel part 205h is a part formed in parallel with a first back end surface 205f, and it is a part of the first connecting end surface 205e. When the first optical component (first holder) 205c has the parallel part 205h, the load, applied on the performing of the holder pushing, operates vertically to the parallel part 205h. In this case, the second optical component (second holder) 205b has a part formed in parallel with the first back end surface 205f, in one part of the second connecting end surface.

Figure 19:
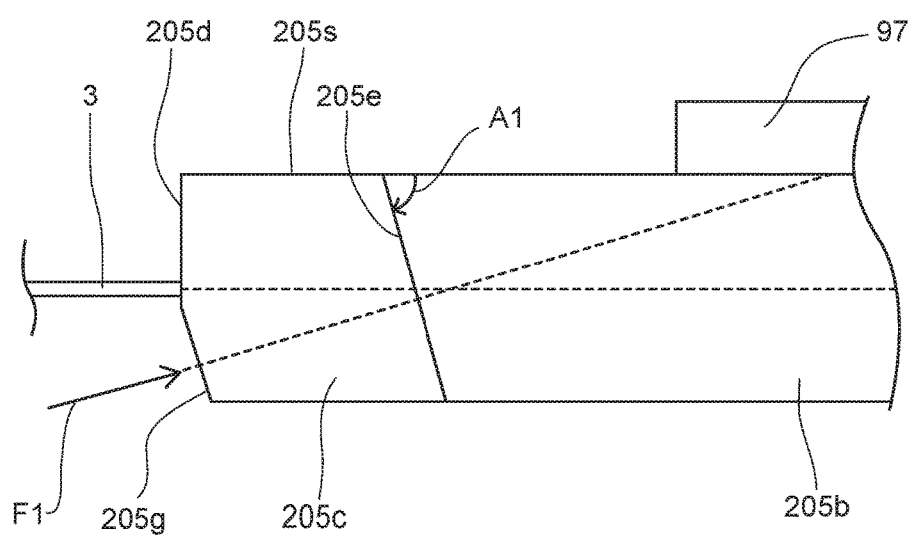
FIG. 19 is a plan view showing the essential part of the coupling structure of optical components according to another modified example.

Further, in case of the coupling structure of optical components 205, it is possible that the first optical component (first holder) 205c has the parallel part 205g, as illustrated in FIG. 19. The parallel part 205g are parts formed in parallel with the first connecting end face 205e, and it is a part of the first back end face 205d. When the first optical component (first holder) 205c has the parallel part 205g, the load, applied on the performing of the holder pushing, operates vertically to the first connecting end face 205e. In this case, it is preferable that a holding member 97 is arranged on the extended line of the load F1, out of position alignment of the second optical component 205b is avoided.

Others, in the above described embodiments, YAG laser L is irradiated to solder 62x, in the solder layer forming step. In this point, when the first holder 10 is formed with metal such as gold, silver aluminum, stainless or the like, it is possible that YAG laser L is irradiated to the first holder 10, in the solder layer forming step. In this case, the first holder 10 is heated by the irradiation of the YAG laser L. The heat is conveyed to the solder 62x from the first holder 10, and the solder 62x melts by the heat. Therefore, the coupling solder layers 62 are also formed in this case. Further, CW laser is able to be irradiated instead of YAG laser L.

What is claimed is:

1. A coupling structure of optical components comprising:
a first optical component, a second optical component and a coupling solder layer;
wherein the first optical component comprises at least one of a first optical fiber or a first waveguide, a first holder holding at least one of the first optical fiber or the first waveguide and a first metal layer formed on a first connecting end surface, of the first holder, being connected with the second optical component,
wherein the second optical component comprises at least one of a second optical fiber or a second waveguide, a second holder holding at least one of the second optical fiber or the second waveguide and a second metal layer formed on a second connecting end surface, of the second holder, being connected with the first optical component;
wherein the coupling solder layer is in direct contact with both of the first metal layer and the second metal layer, and formed with solder,
wherein an interval between the first optical component and the second optical component is adjusted by pushing a back end surface of the first holder along an optical axis via a pushing apparatus, the back end surface of the first holder being opposing to the first connecting end surface of the first holder.

2. The coupling structure of optical components according to claim 1,
wherein a thickness of a part of the coupling solder layer close to the first optical fiber or the first waveguide, is thinner than a thickness of the other part of the coupling solder layer.

3. A coupling structure of optical components comprising:
a first optical component, a second optical component and a coupling solder layer;
wherein the first optical component comprises a lensed fiber having a tip part formed by a lens-shape, a first holder holding the lensed fiber and a first metal layer formed on a first connecting end surface, of the first holder, being connected with the second optical component,
wherein the second optical component comprises a waveguide, a second holder holding the waveguide and a second metal layer formed on a second connecting end surface, of the second holder, being connected with the first optical component;
wherein the coupling solder layer is in direct contact with both of the first metal layer and the second metal layer, and formed with solder,
wherein the coupling structure of optical components further comprising:
an interval adjusted structure which the interval between the lensed fiber and the waveguide is adjusted so that the focus of the lensed fiber coincides with the waveguide by a holder pushing, which the first holder is pushed,
wherein an interval between the first optical component and the second optical component is adjusted by pushing a back end surface of the first holder along an optical axis via a pushing apparatus, the back end surface of the first holder being opposing to the first connecting end surface of the first holder.

4. The coupling structure of optical components according to claim 3,
wherein a thickness of a part of the coupling solder layer close to the lensed fiber is thinner than a thickness of the other part of the coupling solder layer.

5. The coupling structure of optical components according to claim 3,
wherein the first holder comprises a first back end surface opposing to the first connecting end surface and the second holder comprises a second back end surface opposing to the second connecting end surface,
wherein the first holder has a first parallel part, and the second holder has a second parallel part,
wherein the first parallel part is a part of the first back end surface or the first connecting end surface, and the first parallel part is a part formed in parallel of the first back end surface and the first connecting end surface,
wherein the second parallel part is a part of the second connecting end surface, and the second parallel part is a part formed in parallel with the first back end surface.

6. A coupling method of optical components comprising:
a first optical component manufacturing step being manufactured a first optical component; and
a second optical component manufacturing step being manufactured a second optical component,
wherein the first optical component manufacturing step, which a first holder component, being held at least one of a first optical fiber or a first waveguide on a first holder, is prepared, and a first metal layer is formed on a first connecting end surface being connected with the second optical component concerning the first holder component, and the first optical component is manufactured,
wherein the second optical component manufacturing step, which a second holder component, being held at least one of a second optical fiber or a second waveguide on a second holder, is prepared, and a second metal layer is formed on a second connecting end surface being connected with the first optical component concerning the second holder component, and the second optical component is manufactured,
wherein the coupling method of optical components further comprising:
a holder opposing step being opposed the first connecting end surface and the second connecting end surface to insert a solder between the first metal layer and the second metal layer, concerning the first optical component and the second optical component;
an optical axis adjusting step being adjusted optical axes of at least one of the first optical fiber or the first waveguide and at least one of the second optical fiber or the second waveguide so as to coincide each other;
a solder forming step being formed a solder layer between the first metal layer and the second metal layer by melting and stiffening the solder with laser irradiation to the first optical component or the second optical component;
a holder pushing step being performed a holder pushing by a pushing apparatus, which pushes a back end surface of the first holder along with an optical axis direction, the back end surface of the first holder being opposing to the first connecting end surface of the first holder; and
an interval adjusting step being adjusted an interval between the first optical component and the second optical component, by the pushing apparatus,
wherein the solder forming step is performed while the holder pushing is performed.

7. A coupling method of optical components comprising:
a first optical component manufacturing step being manufactured a first optical component; and a second optical component manufacturing step being manufactured a second optical component, wherein the first optical component manufacturing step, which a first holder component, being held at least one of a first optical fiber or a first waveguide on a first holder, is prepared, and a first metal layer is formed on a first connecting end surface being connected with the second optical component concerning the first holder component, and the first optical component is manufactured, wherein the second optical component manufacturing step, which a second holder component, being held at least one of a second optical fiber or a second waveguide on a second holder, is prepared, and a second metal layer is formed on a second connecting end surface being connected with the first optical component concerning the second holder component, and the second optical component is manufactured, wherein the coupling method of optical components further comprising:

a holder opposing step being opposed the first connecting end surface and the second connecting end surface to insert a solder between the first metal layer and the second metal layer, concerning the first optical component and the second optical component;

an optical axis adjusting step being adjusted optical axes of at least one of the first optical fiber or the first waveguide and at least one of the second optical fiber or the second waveguide so as to coincide each other;

a solder forming step being formed a solder layer between the first metal layer and the second metal layer by melting and stiffening the solder with laser irradiation to the first optical component or the second optical component; and a holder pushing step being performed a holder pushing, which the first holder or the second holder is pushed along with an optical axis direction; and an interval adjusting step being adjusted an interval between the first optical fiber or the first waveguide and the second optical fiber or the second waveguide, by the holder pushing, wherein the solder forming step is performed while the holder pushing is performed;

wherein the holder pushing step is performed so that a first center of gravity extended part, of a first back end surface opposing to the first connecting end surface, arranged on a center of gravity extended line of the first holder, or a second center of gravity extended part, of a second back end surface opposing to the second connecting end surface, arranged on the center of gravity extended line of the second holder, is pushed along with the optical axis direction.

8. A coupling method of optical components comprising:

a first optical component manufacturing step being manufactured a first optical component; and a second optical component manufacturing step being manufactured a second optical component, wherein the first optical component manufacturing step, which a first holder component, being held at least one of a first optical fiber or a first waveguide on a first holder, is prepared, and a first metal layer is formed on a first connecting end surface being connected with the second optical component concerning the first holder component, and the first optical component is manufactured, wherein the second optical component manufacturing step, which a second holder component, being held at least one of a second optical fiber or a second waveguide on a second holder, is prepared, and a second metal layer is formed on a second connecting end surface being connected with the first optical component concerning the second holder component, and the second optical component is manufactured, wherein the coupling method of optical components further comprising:

a holder opposing step being opposed the first connecting end surface and the second connecting end surface to insert a solder between the first metal layer and the second metal layer, concerning the first optical component and the second optical component;

an optical axis adjusting step being adjusted optical axes of at least one of the first optical fiber or the first waveguide and at least one of the second optical fiber or the second waveguide so as to coincide each other;

a solder forming step being formed a solder layer between the first metal layer and the second metal layer by melting and stiffening the solder with laser irradiation to the first optical component or the second optical component;

a holder pushing step being performed a holder pushing, which the first holder or the second holder is pushed along with an optical axis direction; and an interval adjusting step being adjusted an interval between the first optical fiber or the first waveguide and the second optical fiber or the second waveguide, by the holder pushing, wherein the solder forming step is performed while the holder pushing is performed;

wherein the holder pushing step is performed so that a first center of gravity extended part, of a first back end surface opposing to the first connecting end surface, arranged on a center of gravity extended line of the first holder, or a second center of gravity extended part, of a second back end surface opposing to the second connecting end surface, arranged on the center of gravity extended line of the second holder, is pushed along with the optical axis direction; and wherein the holder pushing step is performed so that a pushing member is in contact with the first center of gravity extended part or the second center of gravity extended part and the pushing member is operated along with the vertical direction.

9. A coupling method of optical components comprising:

a first optical component manufacturing step being manufactured a first optical component; and a second optical component manufacturing step being manufactured a second optical component, wherein the first optical component manufacturing step, which a first holder component, being held a lensed fiber having a tip part formed by a lens-shape on a first holder, is prepared, and a first metal layer is formed on a first connecting end surface being connected with the second optical component concerning the first holder component, and the first optical component is manufactured, wherein the second optical component manufacturing step, which a second holder component, being held a waveguide is held on a second holder, is prepared, and a second metal layer is formed on a second connecting end surface being connected with the first optical component concerning the second holder component, and the second optical component is manufactured, wherein the coupling method of optical components further comprising:

a holder opposing step being opposed the first connecting end surface and the second connecting end surface to insert a solder between the first metal layer and the second metal layer, concerning the first optical component and the second optical component;

an optical axis adjusting step being adjusted optical axes of the lensed fiber and the waveguide so as to coincide each other;

a holder pushing step being performed a holder pushing by a pushing apparatus, which pushes a back end surface of the first holder along with an optical axis direction, the back end surface of the first holder being opposing to the first connecting end surface of the first holder;

an interval adjusting step being adjusted an interval between the lensed fiber and the second waveguide, so that the focus of the lensed fiber coincides with the waveguide by the holder pushing;

a solder forming step being formed a solder layer between the first metal layer and the second metal layer by melting and stiffening the solder with laser irradiation to the first optical component, while the holder pushing is performed; and an interval adjusting step being adjusted an interval between the first optical component and the second optical component, by the pushing apparatus, wherein the solder forming step is performed while the holder pushing is performed.

10. A coupling method of optical components comprising:

a first optical component manufacturing step being manufactured a first optical component; and a second optical component manufacturing step being manufactured a second optical component, wherein the first optical component manufacturing step, which a first holder component, being held a lensed fiber having a tip part formed by a lens-shape on a first holder is prepared, and a first metal layer is formed on a first connecting end surface being connected with the second optical component concerning the first holder component, and the first optical component is manufactured, wherein the second optical component manufacturing step, which a second holder component, being held a waveguide is held on a second holder, is prepared, and a second metal layer is formed on a second connecting end surface being connected with the first optical component concerning the second holder component, and the second optical component is manufactured, wherein the coupling method of optical components further comprising:

a holder opposing step being opposed the first connecting end surface and the second connecting end surface to insert a solder between the first metal layer and the second metal layer, concerning the first optical component and the second optical component;

an optical axis adjusting step being adjusted optical axes of the lensed fiber and the waveguide so as to coincide each other;

a holder pushing step being performed a holder pushing which the first holder is pushed along with an optical axis direction;

an interval adjusting step being adjusted an interval between the lensed fiber and the second waveguide, so that the focus of the lensed fiber coincides with the waveguide by the holder pushing; and a solder forming step being formed a solder layer between the first metal layer and the second metal layer by melting and stiffening the solder with laser irradiation to the first optical component, while the holder pushing is performed, wherein the holder pushing step is performed so that a first center of gravity extended part, of a first back end surface opposing to the first connecting end surface, arranged on a center of gravity extended line of the first holder, is pushed along with the optical axis direction.

11. A coupling method of optical components comprising:

a first optical component manufacturing step being manufactured a first optical component; and a second optical component manufacturing step being manufactured a second optical component, wherein the first optical component manufacturing step, which a first holder component, being held a lensed fiber having a tip part formed by a lens-shape on a first holder is prepared, and a first metal layer is formed on a first connecting end surface being connected with the second optical component concerning the first holder component, and the first optical component is manufactured, wherein the second optical component manufacturing step, which a second holder component, being held a waveguide is held on a second holder, is prepared, and a second metal layer is formed on a second connecting end surface being connected with the first optical component concerning the second holder component, and the second optical component is manufactured, wherein the coupling method of optical components further comprising:

a holder opposing step being opposed the first connecting end surface and the second connecting end surface to insert a solder between the first metal layer and the second metal layer, concerning the first optical component and the second optical component;

an optical axis adjusting step being adjusted optical axes of the lensed fiber and the waveguide so as to coincide each other;

a holder pushing step being performed a holder pushing which the first holder is pushed along with an optical axis direction;

an interval adjusting step being adjusted an interval between the lensed fiber and the second waveguide, so that the focus of the lensed fiber coincides with the waveguide by the holder pushing; and a solder forming step being formed a solder layer between the first metal layer and the second metal layer by melting and stiffening the solder with laser irradiation to the first optical component, while the holder pushing is performed;

wherein the holder pushing step is performed so that a first center of gravity extended part, of a first back end surface opposing to the first connecting end surface, arranged on a center of gravity extended line of the first holder, is pushed along with the optical axis direction; and wherein the holder pushing step is performed so that a pushing member is in contact with the first center of gravity extended part and the pushing member is operated along with the vertical direction.

* * * * *